US005445353A

United States Patent [19]

Sakamoto

[11] Patent Number: 5,445,353

[45] Date of Patent: Aug. 29, 1995

[54] SUPPORT DEVICE FOR ANIMAL CLAMP

[75] Inventor: Yuji Sakamoto, Kobe, Japan

[73] Assignee: Senju Seiyaku Kabushiki Kaisha, Osaka, Japan

[21] Appl. No.: 129,171

[22] PCT Filed: Feb. 13, 1992

[86] PCT No.: PCT/JP92/00151

§ 371 Date: Oct. 12, 1993

§ 102(e) Date: Oct. 12, 1993

[87] PCT Pub. No.: WO93/15689

PCT Pub. Date: Aug. 19, 1993

[51] Int. Cl.$^{6}$ .............................................. F16M 13/00

[52] U.S. Cl. .................................... 248/421; 248/371; 248/185; 108/10

[58] Field of Search ............... 248/371, 396, 398, 185, 248/421, 277, 652, 454; 119/752; 108/10, 145

[56] References Cited

U.S. PATENT DOCUMENTS 1,381,837 6/1921 Hopaidaszka .................. 248/421 X
1,550,944 8/1925 Beidler et al. .................. 248/185 X
3,782,713 1/1974 Yount .............................. 248/396 X
3,861,328 1/1975 Lawless .......................... 108/145 X
4,885,918 12/1989 Vaccaro .......................... 248/421 X
4,934,647 6/1990 Edwards ............................ 248/371

*Primary Examiner*—Karen J. Chotkowski
*Attorney, Agent, or Firm*—Armstong, Westerman, Hattori, McLeland & Naughton

[57] ABSTRACT

This is a device for supporting an animal clamp (100) fixing a small laboratory animal in a specified position with respect to a testing apparatus (300). A base board (2) is fixed to the testing apparatus (300). An elevating board (4) is raised or lowered by jacks (31, 32) installed between it and base board (2), and a clamp mounting board (8) is tilted by jack (61) and sliding member (62) installed between it and elevating board (4).

As a result, the height position and inclination angle of the animal clamp (100) mounted on the clamp mounting board (8) are determined, and they may be finely adjusted by properly manipulating the jacks (31, 32, 61). The animal clamp (100) does not slip off the clamp mounting board (8) because of the clamp slip preventive flange piece (7).

20 Claims, 3 Drawing Sheets

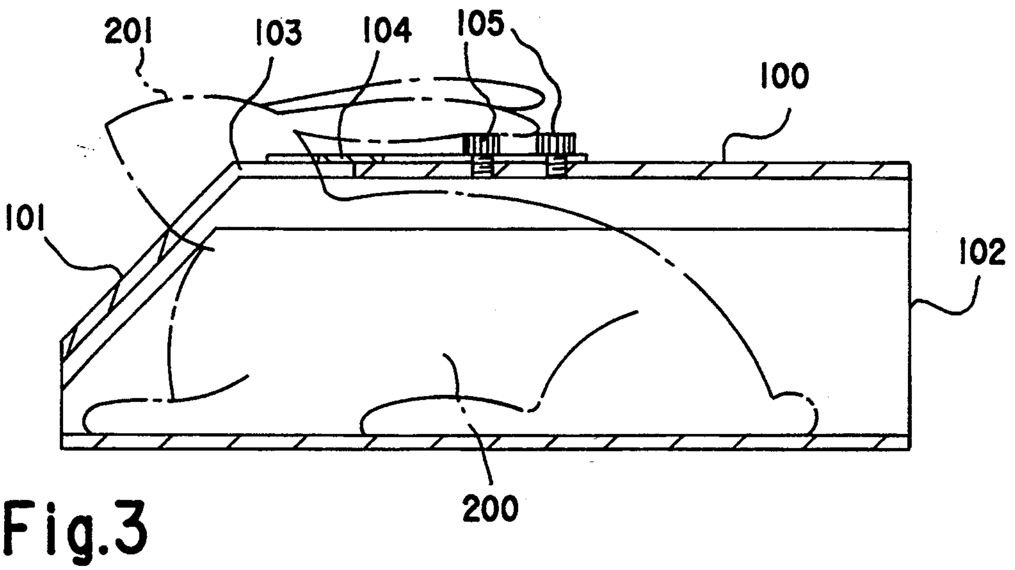
Fig.3
Fig.4
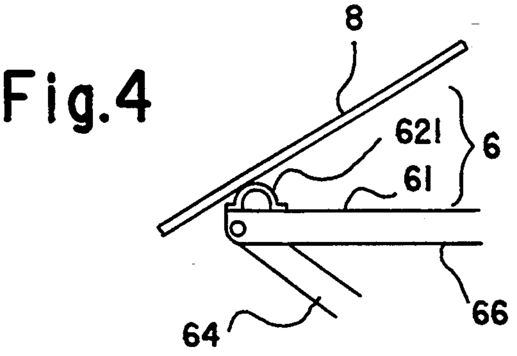
Fig.5
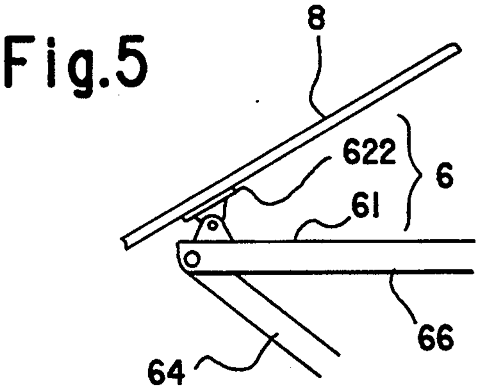

SUPPORT DEVICE FOR ANIMAL CLAMP

FIELD OF THE INVENTION

The present invention relates to a support device for animal clamp, and more particularly to a device for supporting an animal clamp fixing a small laboratory animal in a specific position with respect to examination equipment.

PRIOR ART

In laboratory experiments using rabbits, guinea pigs and other small animals, animal clamps are usually used to restrain the motions to prevent the animals from struggling or escaping during the experiment. An example is shown in FIG. 3.

This animal clamp 100 is of box type having the front end portion 101 reduced and the rear end portion 102 opened. In the front end portion 101, there is an opening 103 at its upper surface for projecting the head 201 of an animal 200. Behind the opening 103, a fixing plate 104 for pressing and fixing the neck of the animal 200 from the back is slidably attached. In use, the animal 200 is put in from the rear end portion (opened portion) 102 of the animal clamp 100 with the head 201 first, and after projecting the head 201 out of the opening 103, the fixing plate 104 is moved to the front end portion 101 side to press the neck, and finally fixing screws 105, 105 are tightened to fasten the fixing plate 104 completely.

In experiment, for example, a drug is administered to the animal 200 fixed in the animal clamp 100, and its reaction is observed by testing apparatus. If the testing apparatus is small in size to be held in the hand of the operator, the apparatus may be easily fitted to the target position of the animal. If the case of a large apparatus, however, it is not so easy as in the small apparatus, and the animal clamp must be set at a specified position in relation to the testing apparatus. However, since the setting position of the animal clamp is usually higher than the floor on which the testing apparatus is installed, the animal clamp must be lifted to a specified method and supported by some means.

In such a case, hitherto, a platform was prepared by using box or board, and the animal clamp was put thereon.

In such prior art, however, it not only takes time to prepare the platform, but also it is necessary to adjust the height every time by remaking the platform when the size of animal or animal clamp or the type of testing apparatus is changed, and the preparation for observation is complicated.

Besides, when the animal is relatively heavy, the height adjustment is very difficult, and it is hard to correct the position of the animal with respect to the testing apparatus, and accurate observation may not be done.

Furthermore, for example, when observing the eyes of the animal, usually, the head of the animal is inclined and the animal clamp is tilted to fit the eyes to the specified position of the testing apparatus, but in the prior art it is difficult to incline the animal clamp correctly to a proper angle for observation.

The invention is to solve all these problems of the prior art by presenting a support device for an animal clamp capable of supporting the animal clamp at a specified position with respect to the testing apparatus easily and securely, and adjusting the position easily, regardless of the weight of the animal.

SUMMARY OF THE INVENTION

To achieve the above object, the invention presents a support device for animal clamp for supposing the animal clamp fixing a small laboratory animal at a specified position with respect to a testing apparatus, comprising a base board fitted to the testing apparatus either directly or indirectly, an elevating board disposed above the base board, elevating means for lifting or lowering the elevating board, being installed between the base board and elevating board, a clamp mounting board disposed on the elevating board for mounting the animal clamp on, with the front edge pivoted to the elevating board, tilting means for tilting the clamp mounting board about the front edge, being installed between the elevating board and the clamp mounting board, and clamp slip preventive means to prevent the animal clamp from slipping off the clamp mounting board.

The base board is mounted on a table disposed adjacently to the testing apparatus, or fixed to the testing apparatus through proper stay, arm or other gripping tool suited to the testing apparatus.

The elevating board is lifted and lowered by the elevating means installed between it and the base board, and the clamp mounting board is tilted by the tilting means installed between it and the elevating board. Accordingly, the position of the animal clamp mounted on the clamp mounting board, that is, the height position and inclination angle may be determined. By properly manipulating the elevating means and tilting means, the position may be finely adjusted.

Furthermore, owing to the clamp slip preventive means of the clamp mounting board, the animal clamp does not slip off the clamp mounting board.

BRIEF DESCRIPTION OF THE DRAWINGS

FIG. 3 is a sectional view showing an example of animal clamp, and FIG. 4 and FIG. 5 are partially magnified views showing other examples of sliding members for composing the tilting means.

DETAILED DESCRIPTION OF THE PREFERRED EMBODIMENTS

The invention is described in greater detail below by referring to the accompanying drawings.

Figure 1:
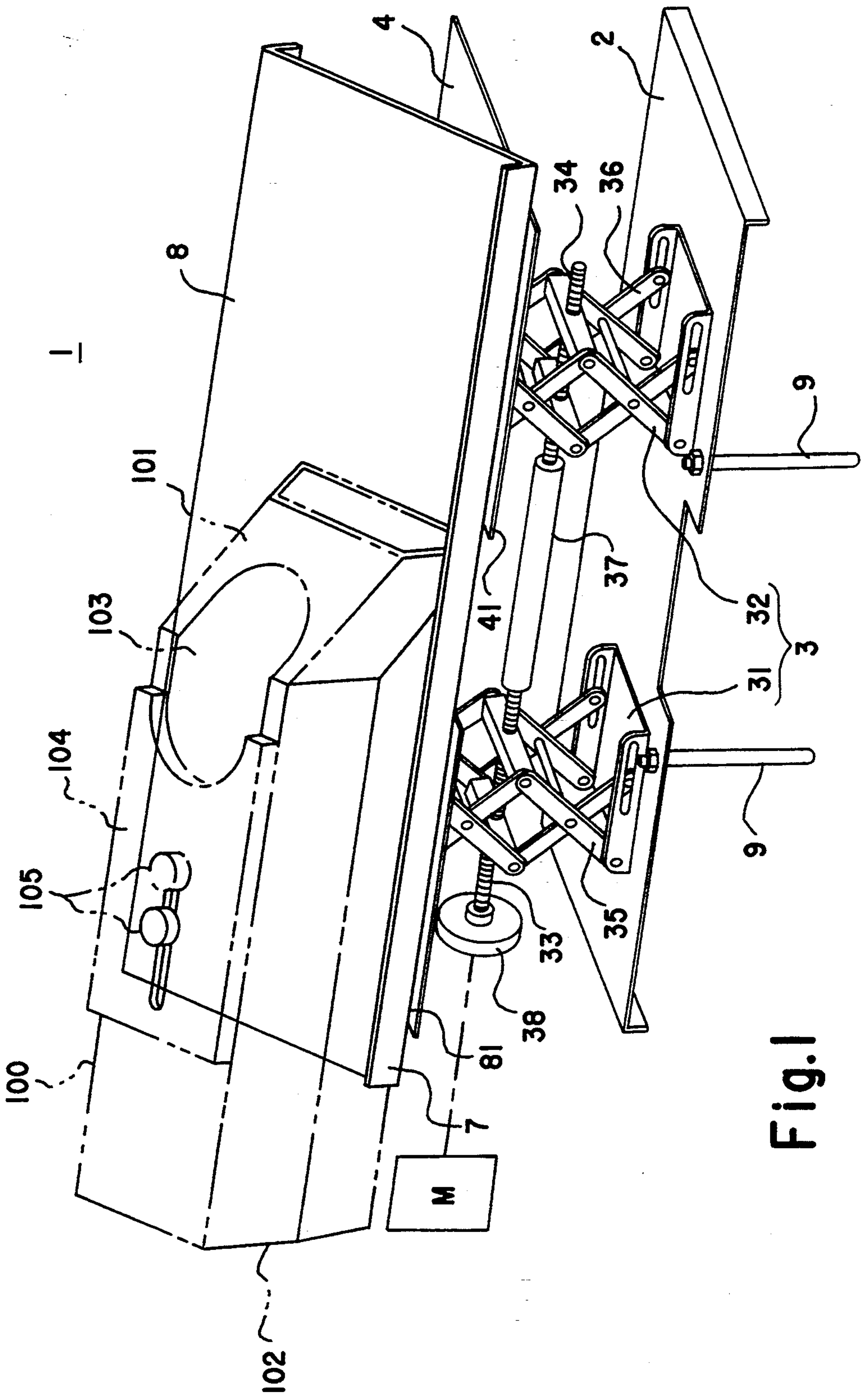
FIG. 1 is an overall perspective view showing an embodiment of a support device for animal clamp according to the invention.
Figure 2:
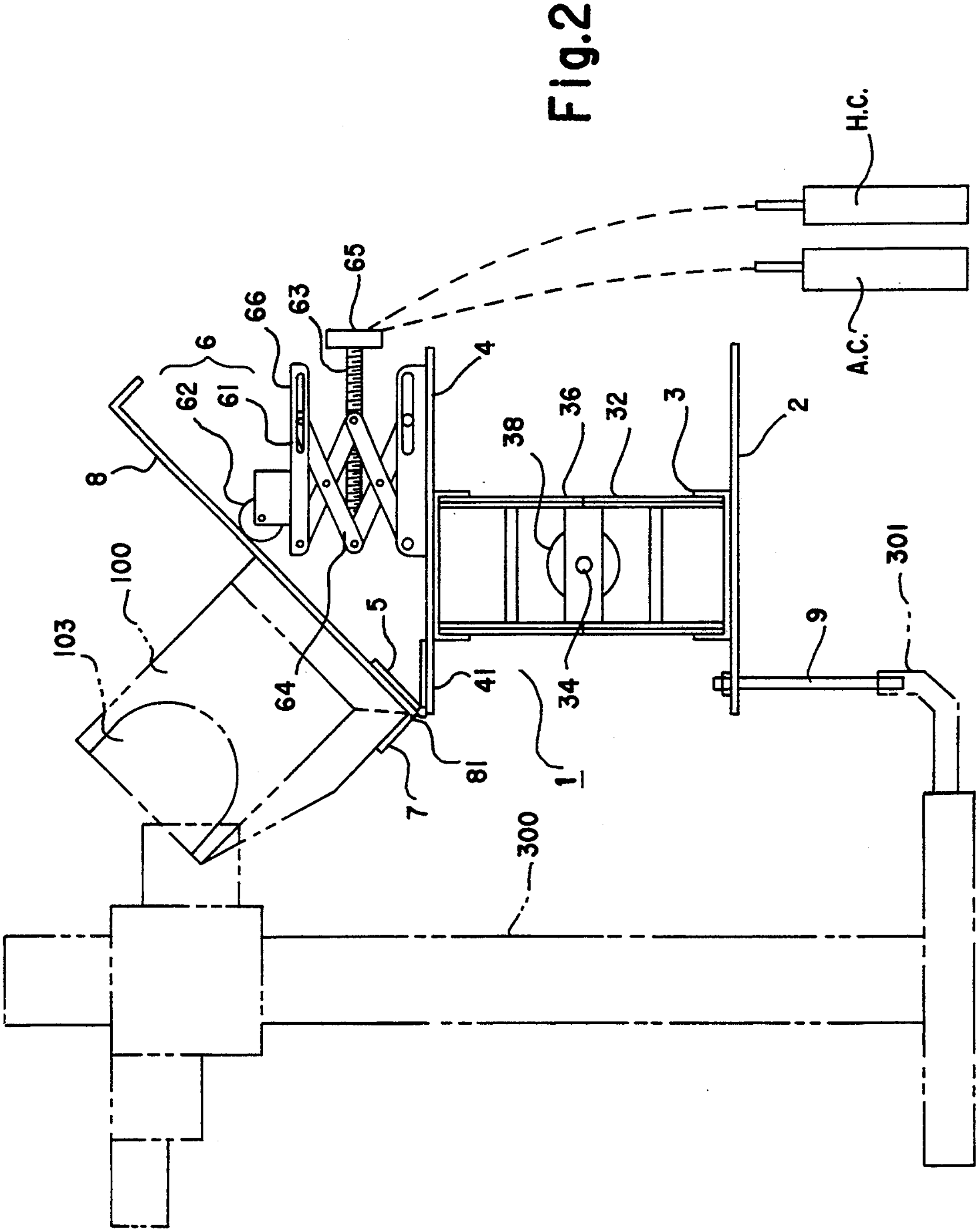
FIG. 2 is its side view.

As is shown in FIG. 1 and FIG. 2, this support device for animal clamp 1 comprises a base board 2, an elevating board 4 disposed above the base board, elevating means 3 disposed between the base board and elevating board 4 for lifting and lowering the elevating board 4, a clamp mounting board 8 for mounting an animal clamp on disposed on the elevating board 4 with the front edge 81 pivoted on the elevating board, tilting means 6 disposed between the elevating board 4 and clamp mounting board 8 for tilting the clamp mounting board 8 about its front edge 81, and clamp slip preventive means 7 for preventing the animal clamp 100 from slipping off the clamp mounting board 8.

The base board 2 is made of metal plate or synthetic resin plate. A pair of mounting stays 9, 9 are drooping from the front edge of the base board 2. The mounting stays 9, 9 are intended to mount the device 1 on a testing apparatus 300, and are disposed opposite to a pair of testing bench mounting parts 301 of the resting apparatus 300 as shown in FIG. 2. In this case, the testing apparatus 300 shown in the drawing is the human ocular fundus inspection tool used for animal eyegrounds examination, and the testing bench mounting parts 301 are the parts for supporting the jaw and forehead of the man. If the testing apparatus has different bench mounting parts, instead of the mounting stays 9, mounting parts in a form corresponding to the different mounting parts may be installed on the base board. Or, if the testing apparatus does not have any bench mounting part, a grip for holding a part of the testing apparatus may be disposed on the base board 2, or without putting anything on the base board 2, it may be directly mounted on a table placed adjacently to the testing apparatus.

The elevating means 3 is intended to lift and lower the elevating board, and the clamp mounting board 8 through the elevating board, and to position the animal clamp 100 mounted on the clamp mounting board 8 at a specified height. In this embodiment, the elevating means 3 is composed of a set of two jacks 31, 32. The jacks 31, 32 are both so-called pantograph type jacks, and the pantographs 34,36 are expanded and contracted by screw rods 33, 34. The both jacks 31, 32 are fixed parallel on the base board 2 so that the mutual screw rods 33, 34 may be positioned coaxially, and the screw rods 33, 34 are mutually linked with a linkage rod 37. A manipulation handle 38 is attached to the end of one screw rod 33, and by turning this manipulation handle 38 by hand, the both screw rods 33, 34 are turned, and the both jacks 31, 32 are raised or lowered together.

In this embodiment, the both screw rods 33, 34 are turned by hand, but they may be rotated by a motor M as shown in FIG. 1. The jacks 31, 32 are not limited to the form shown in the embodiment. The elevating means 3 is not limited to the jack, but an air cylinder A.C. as shown in FIG. 2, an hydraulic cylinder H.C. as shown in FIG. 2, and other machines generally used in elevating and lowering motion may be used.

The elevating board 4 is made of, same as the base board 2, metal plate or synthetic resin plate. This elevating board 4 is placed and fixed on the jacks 31, 32, and is moved up and down by the ascending and descending motion of the jacks 31, 32.

The clamp mounting board 8 is for receiving the animal clamp 100, and is made of a metal plate or a synthetic resin plate, same as the base board 2 and elevating board 4. The front edge 81 of the clamp mounting board 8 is pivoted to the front edge 41 of the elevating board 4 through one or a plurality of hinges 5, so as to be tiltable in the vertical direction about the front edge 81.

The clamp slip preventive means 7 is intended to prevent the animal clamp 100 from slipping off the clamp mounting board 8. In this embodiment, this means 7 is composed of a flange standing up from the front edge 81 of the clamp mounting board 8. However, the clamp slip preventive means 7 is not limited to such flange, but it may be a band for tying the animal clamp 100, for example, to the clamp mounting board 8.

The tilting means 6 is to tilt the clamp mounting board 8 to incline the animal clamp 100 on the clamp mounting board 8 at a specified angle. In this embodiment, the tilting means 6 is composed of a jack 61 and a sliding member 62.

The jack 61 is a so-called pantograph type jack, and is designed to extend or contract the pantograph 64 by the screw rod 63. This jack 61 is fixed in the middle of the elevating board 4 so that its screw rod 63 may orthogonally cross the screw rods 33, 34 of the two jacks 31, 32 for composing the elevating means 3. A manipulation handle 65 is attached to the screw rod 63, and by turning this manipulation handle 65 by hand, the screw rod 63 is turned, and the jack 61 is raised or lowered.

The sliding member 62 is intended to achieve smooth rubbing of a top plate 66 of the jack 61 and the rear side of the clamp mounting board 8, always while the jack 61 is ascending or descending. In this embodiment, the sliding member 62 comprises a roller, and this roller 62 is fitted to the front edge of the top plate 66 of the jack 61. The sliding member 62 is not limited to such roller, but it may be a ball or others as shown in FIG. 4 and FIG. 5. In the example shown in FIG. 4, the sliding member is an arch curved piece 621 made of synthetic resin piece with small coefficient of friction. In the example shown in FIG. 5, the sliding member is an oscillating receiving piece 622 with a smooth surface. In the case of the example in FIG. 5, the synthetic resin piece described above may be also adhered to the surface of the receiving piece 622.

In this embodiment, the screw rod 63 of the jack 61 is turned by hand, but it may be also rotated by a motor. The form of the jack 61 is not limited to the form shown herein. Furthermore, the sliding means 6 is not limited to the jack, but air cylinder, hydraulic cylinder, or other means may be used.

The method of use of the support device for animal clamp 1 described herein is explained below.

In the first place, the mounting stays 9 are inserted into the bench mounting parts 301 of the testing apparatus 300 (the ocular fundus inspection instrument), and the support device 1 is set in the testing apparatus 300.

Next, the animal clamp 100 fixing an animal is set on the clamp mounting board 8.

In succession, operating the manipulation handle 38 of the elevating means 3 and the manipulation handle 65 of the tilting means 6, the elevating board 4 and clamp mounting board 8 are lifted or lowered so that the animal clamp 100 may be located at specified height and specific tilting angle with respect to the testing apparatus 300, and the clamp mounting board 8 is tilted. Is this time, since the clamp mounting board 8 ascends, descends and inclines smoothly by the elevating means 3 and tilting means 6, and the height and angle of the animal clamp 100 may be set finely very smoothly regardless of the weight of the animal. Hence, the precision of examination may be high.

Afterwards, the animal is observed by means of the testing apparatus.

Meanwhile, to reduce the entire weight of the device 1, multiple holes may be provided in all or some of the base board 2, elevating board 4 and clamp mounting board 8.

Industrial Applicability of the Invention

The support device for animal clamp of the invention, being thus composed, allows the clamp mounting board to ascend, descend or incline smoothly. Therefore, regardless of the weight of the animal, the animal clamp may be supported in a specified position with respect to the resting apparatus easily and securely, while the position may be adjusted finely, so that it may be suited to obtain accurate data in experiment using laboratory animals.

What is claimed is:

1. A support device for an animal clamp for supposing the animal clamp fixing a small laboratory animal at a specified position with respect to a testing apparatus, comprising:

a base board fitted to the testing apparatus either directly or indirectly, an elevating board disposed above the base board, elevating means for lifting or lowering the elevating board, being installed between the base board and elevating board, a clamp mounting board disposed on the elevating board for mounting the animal clamp on, with the front edge pivoted to the elevating board, tilting means for tilting the clamp mounting board about the front edge, being installed between the elevating board and the clamp mounting board, clamp slip preventive means to prevent the animal from slipping off the clamp mount board; and wherein the tilting means is composed of a jack, and a sliding member inserted between the jack and the clamp mounting board.

2. A support device for animal clamp of claim 1, wherein the base board has mounting stays for the testing apparatus on its lower surface.

3. A support device for animal clamp of claim 1, wherein the base board has gripping means for gripping a proper position of the testing apparatus.

4. A support device for animal clamp of claim 1, wherein the elevating means is a jack.

5. A support device for animal clamp of claim 4, wherein the jack is of manual type.

6. A support device for animal clamp of claim 4, wherein the jack is driven by a motor.

7. A support device for animal clamp of claim 1, wherein the elevating means is a pair of cooperating jacks.

8. A support device for animal clamp of claim 1, wherein the elevating means is an air cylinder.

9. A support device for animal clamp of claim 1, wherein the elevating means is a hydraulic cylinder.

10. A support device for animal clamp of claim 1, wherein the jack is of manual type.

11. A support device for animal clamp of claim 1, wherein the jack is driven by a motor.

12. A support device for animal clamp of claim 1, wherein the tilting means is composed of an air cylinder, and a sliding member installed between the air cylinder and the clamp mounting board.

13. A support device for animal clamp of claim 1, wherein the tilting means is composed of a hydraulic cylinder, and a sliding member installed between the hydraulic cylinder and the clamp mounting board.

14. A support device for animal clamp of claim 1, 12 or 13, wherein the sliding member is a roller.

15. A support device for animal clamp of claim 1, 12 or 13, wherein the sliding member is a ball.

16. A support device for animal clamp of claim 1, 12 or 13, wherein the sliding member is an arch-shaped receiving piece small in coefficient of friction.

17. A support device for animal clamp of claim 1, 12 or 13, wherein the sliding member is an oscillatable receiving piece.

18. A support device for animal clamp of claim 1, wherein the clamp slip preventive means is a flange formed by lifting upward from the front edge of the clamp mounting board.

19. A support device for animal clamp of claim 1, wherein the clamp slip preventive means is a tightening band for tightening the clamp to the clamp mounting board.

20. A support device for animal clamp of claim 1, wherein multiple holes are provided in all or some of the base board, elevating board and clamp mounting board.

* * * * *